March 23, 1937.  H. G. AXTMANN  2,074,715
BRAKE
Filed Jan. 25, 1934  4 Sheets-Sheet 1

INVENTOR.
HAROLD G. AXTMANN
BY
ATTORNEY

March 23, 1937.  H. G. AXTMANN  2,074,715
BRAKE
Filed Jan. 25, 1934  4 Sheets-Sheet 2
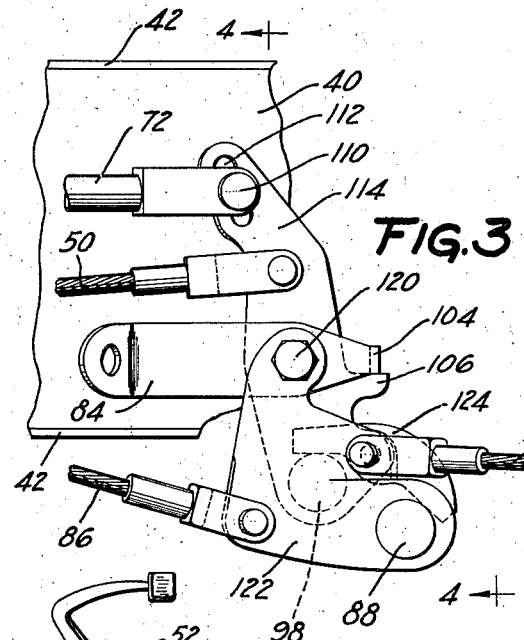
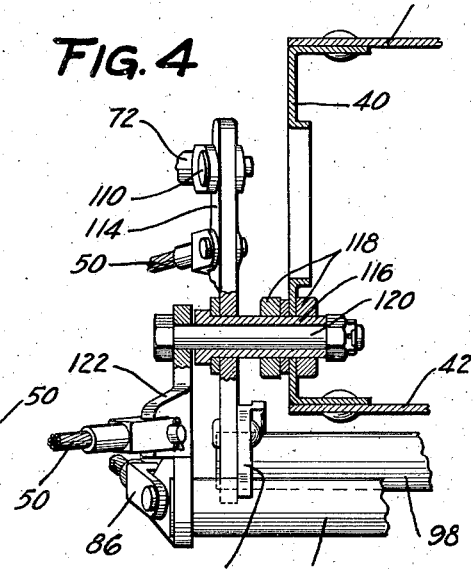
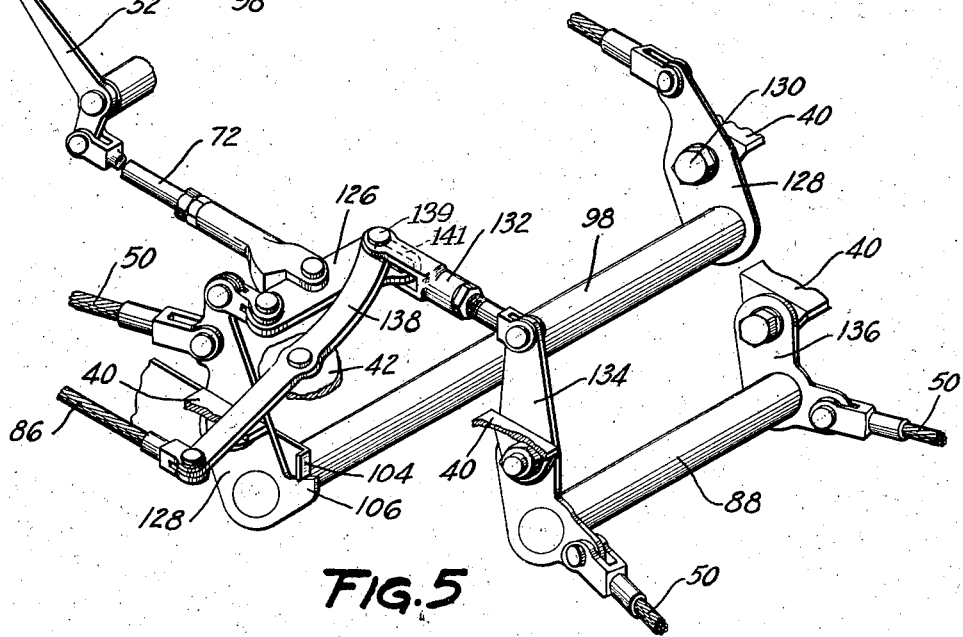
INVENTOR.
HAROLD G. AXTMANN
BY Jerome R. Cox
ATTORNEY.

March 23, 1937. H. G. AXTMANN 2,074,715
BRAKE
Filed Jan. 25, 1934 4 Sheets-Sheet 3
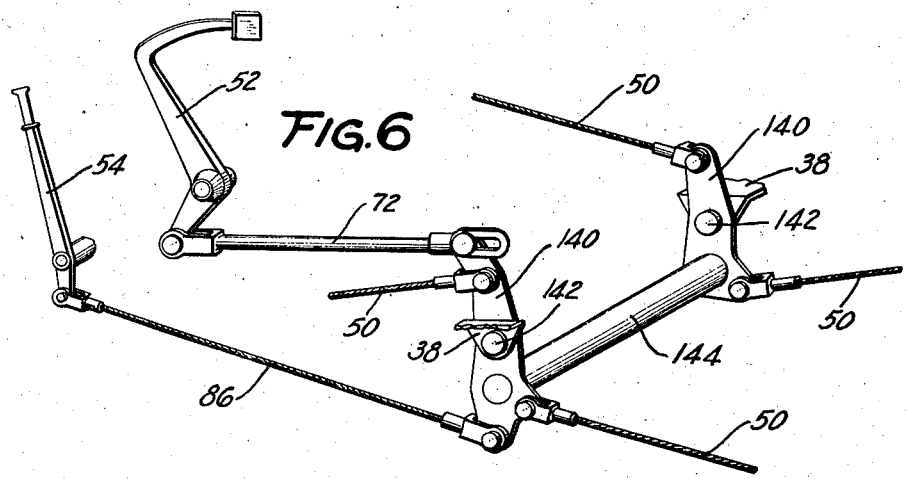
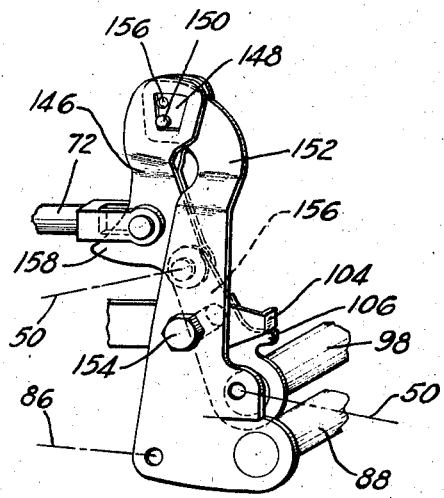
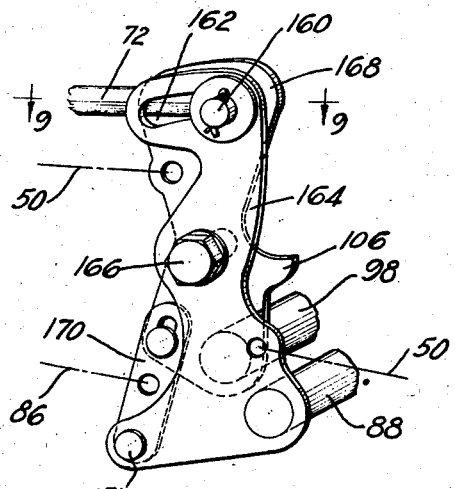
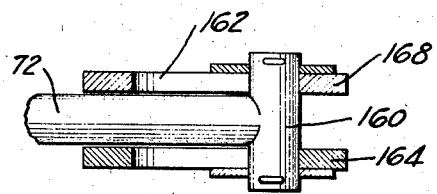
INVENTOR.
HAROLD G. AXTMANN
BY
ATTORNEY

INVENTOR.
HAROLD G. AXTMANN
BY
ATTORNEY

Patented Mar. 23, 1937

2,074,715

UNITED STATES PATENT OFFICE 2,074,715

BRAKE

Harold G. Axtmann, South Bend, Ind., assignor to Bendix Aviation Corporation, South Bend, Ind., a corporation of Delaware Application January 25, 1934, Serial No. 708,171

8 Claims. (Cl. 188—10)

This invention relates to brakes, and is illustrated as embodied in novel systems of four-wheel brakes for automobiles. An object of the invention is to provide a simple and positive hookup or linkage for operating the four brakes.

Preferably each brake is operated by a vertical lever, and the four levers are interconnected by novel rigid shaft means alternatively operated by the usual pedal and hand lever, or by equivalent alternative operating devices. I prefer to connect the two front brake levers by one rigid shaft, and the two rear brake levers by another rigid shaft, in which case the pedal operates both shafts while the hand lever may operate both of them or the rear brake shaft only.

Where used in a vehicle having an X frame, in which two side frame members are rigidly connected by inclined members which are rigidly secured together in the center of the frame, I prefer to mount the brake levers on coaxial pivots at opposite sides of a support mounted on the inclined frame members where they are secured together, or forming the means securing them together. In this case the rigid shaft connections may be mounted below the pivot axes, swinging bodily forward and back in the unobstructed space below the support and below the plane of the inclined members.

Various features of novelty are embodied in the specific constructions and arrangements of parts of the several embodiments described below. These and other features of the invention, including several novel forms of brakes adapted for use with the above-described linkage, will be apparent from the following description of the illustrative embodiments shown in the accompanying drawings, in which:

Figure 3 is a side elevation of a modified construction, corresponding to a view looking from the left in Figure 2;

Figure 4 is a partial section on the line 4—4 of Figure 3;

Figure 5 is a perspective view of another modification, showing only the parts which correspond to the parts shown in Figure 2;

Figure 6 is a perspective view of the principal parts of a fourth embodiment;

Figures 7 and 8 are partial perspective views of the shaft assemblies of fifth and sixth embodiments;

Figure 9 is a section on the line 9—9 of Figure 8; and

Figure 10:
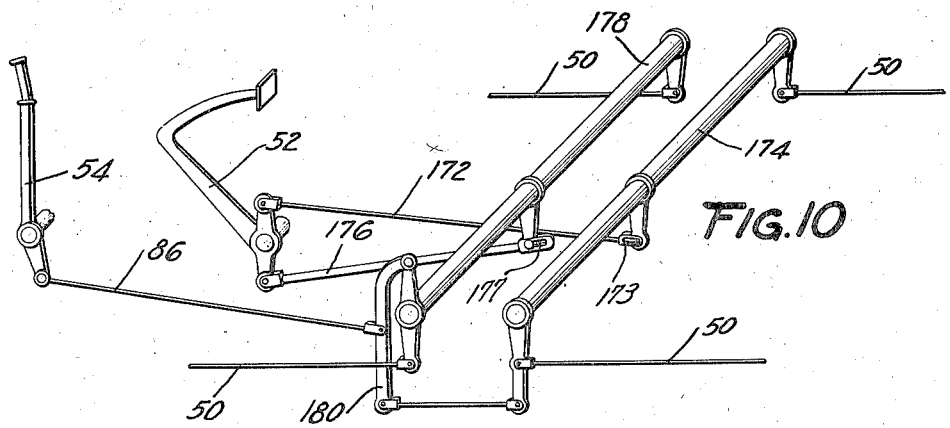
Figure 11:
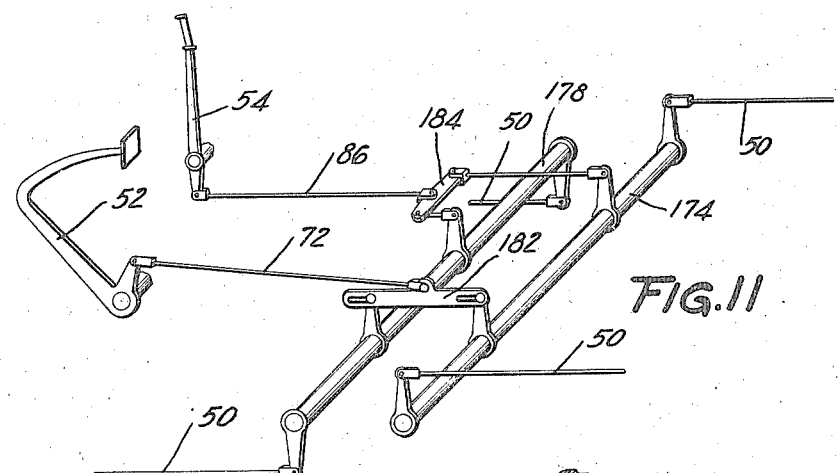
Figure 12:
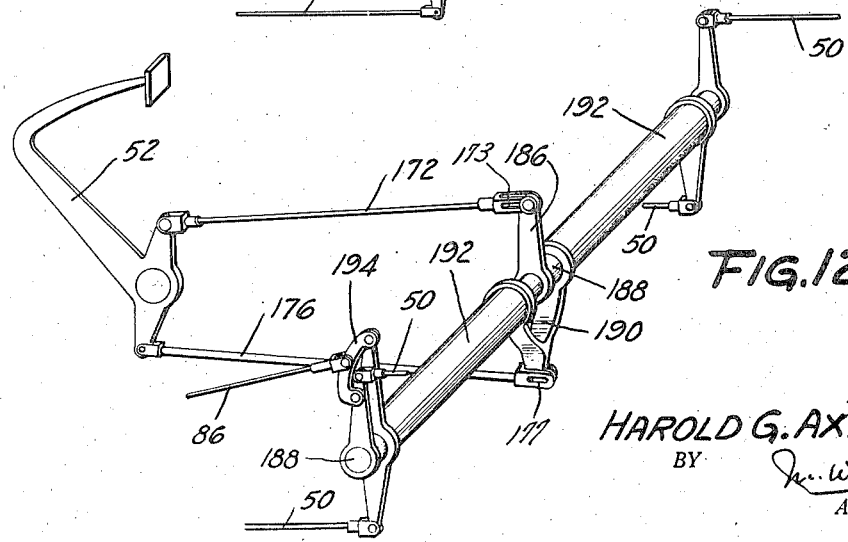

Figures 10, 11, and 12 are perspective views of the shaft assemblies of seventh, eighth, and ninth embodiments.

Figure 1:
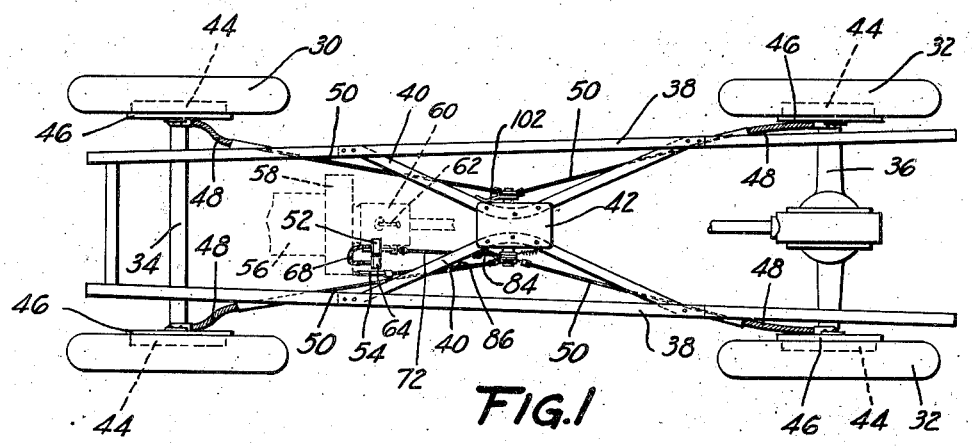
Figure 1 is a top plan view of an automobile chassis having an X frame and showing one of the preferred hookups.
Figure 2:
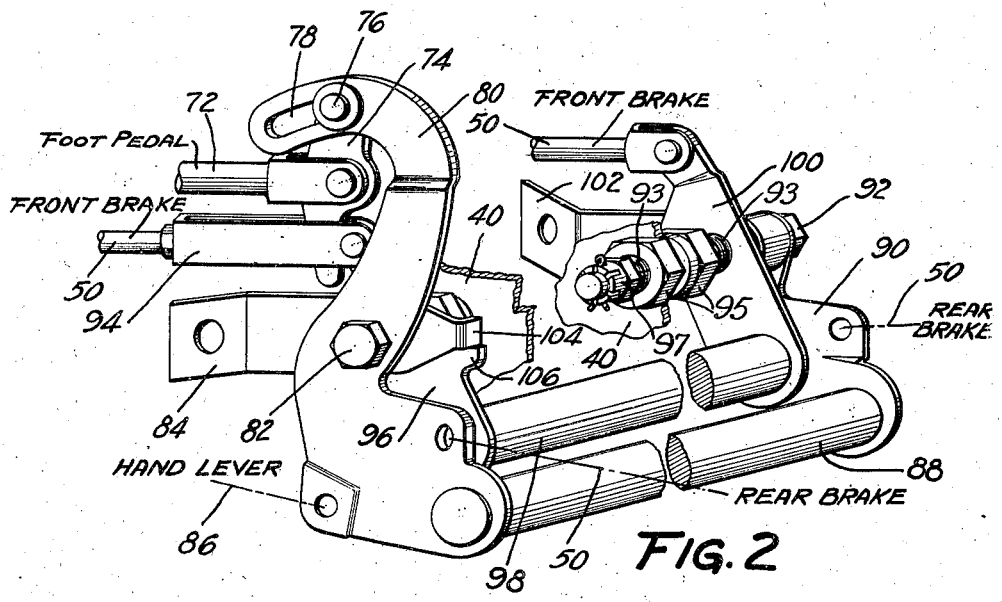
Figure 2 is an enlarged perspective view of those parts of the hookup of Figure 1 which are arranged adjacent the support which secures the inclined frame members together.

The automobile chassis shown in Figures 1 and 2 comprises front and rear road wheels 30 and 32, having corresponding axles 34 and 36 supporting (through the usual springs) an X frame having side members 38 and inclined reinforcing members 40 connected at the center of the frame by a stamping or other support 42. Each wheel has a brake which comprises a drum 44 rotating with the wheel, and a backing plate or other support 46 at the open side of the drum.

A flexible Bowden-type conduit 48 is connected to each backing plate 46 at one end and to the frame members 38 at the other end. The brakes are operated by four cables or other tension elements 50 passing through the conduits 48 into the brakes. The brakes are intended to be operated alternatively by a foot pedal 52 or a hand lever 54, or by suitable equivalent alternatively-operable devices controlled by the driver.

The vehicle is shown with an engine 56, a clutch 58, and a transmission 60 having the usual gear shift lever 62, all arranged in one unit. The clutch is shown operated by the usual pedal 64, having a cable or other tension element passing through a flexible Bowden-type conduit 68 to the clutch throw-out lever.

The pedal 52, in the arrangement of Figures 1 and 2, has a compression or thrust connection 72, having at its end a vertical equalizer bar 74. The upper end of the bar 74 has a pin 76 in a lost-motion slot 78 formed in the generally-horizontal upper end of a stamped steel vertical lever 80 centrally mounted on a horizontal pivot 82 carried, by means such as the left-hand inclined member 40 and a bracket 84 forming in effect an outboard bearing on the member 40. The lower end of the lever 80 is connected, by means such as a flexible cable 86 forming a one-way connection, to the hand lever 54.

The lower end of the lever 80 is rigidly connected, below the axis of pivot 82, by means such as a bodily-movable rigid shaft 88, to a lever 90 which operates the other rear brake, and which is mounted on the opposite inclined member 40 on a pivot 92 which is coaxial with respect to the pivot 82. The pivot 92 is shown journaled in an externally threaded sleeve 93 projecting through an opening in the right hand member 40 and clamped in place by the nuts 95 on each side of the member 40. A castellated nut 97 provided with a cotter key is threaded on the inner end of the pivot 92 to hold it floatingly in place. A similar construction is employed in mounting the pivot 82.

The lower end of the equalizer 74 is normally arranged at the rear end of a slot in an elongated clevis 94 connected at its front end to the cable 50 of the left front brake. The equalizer is, when so arranged, in one-way thrust engagement with the upper end of a vertical lever 96 mounted on the pivot 82.

The lower end of the lever 96 is rigidly connected to one end of a rigid shaft 98, bodily movable just above the path of movement of the shaft 88. The other end of the shaft 98 is rigidly connected to a vertical lever 100 operating the right front brake. The lever 100 is mounted separately on a bearing at the outer end of the sleeve 93. This sleeve may be supported beyond the bearing by a bracket or outboard bearing 102 corresponding to the bracket 84. The mounting of lever 96 is similar to this construction and is identical with the mounting clearly illustrated in Figure 4. The bracket 84 may have a lug 104 engaged by a projection 106 of lever 96, to determine the positions of the parts when the brakes are released.

It will be noted that by supporting each of the pivots 82 and 92 at two points, and securing it there by clamp nuts or the like, even if the pivot is broken, if either the support 42 or the bracket 84 (or 102) remains intact at least one of the two brake levers mounted on the pivot will remain operative.

The above arrangement provides rigid connections from left to right, in the form of shafts 98 and 88 which swing bodily one above the other in the unobstructed space below the support 42 and the reinforcing inclined frame members 40. The pedal operates all four brakes, with the front set equalized against the rear set. The hand lever operates the rear brakes only.

In all the embodiments illustrated free motion of the pedal, without disturbing the hand lever, is permitted by the flexible tension member 86 which flexes when the pedal is depressed.

In the arrangement of Figures 3 and 4, the pedal thrust connection 72 has a thrust pin 110 arranged in an inclined slot 112 in the upper end of a vertical lever 114 corresponding to the lever 80.

The slot 112 is so inclined that during most of the brake-applying pedal movement, while slack in the connections is being taken up and until the brake shoes actually engage the drum, the pin 110 is at the lower end of the slot and a relatively rapid movement of the hookup parts is obtained. As the slot 112 passes its vertical position, the pin 110 shifts to the upper end of the slot, and during the working part of the pedal stroke, while the brake shoes are being pressed against the drums, the lever 114 has a correspondingly greater effective length and therefore a greater mechanical advantage.

The lever 114 is pivoted on a bushing 116 secured to the frame member 40 by clamp nuts 118 to the center portion of the inclined member 40. Within the bushing 116 is journaled a second pivot 120 on which is mounted a lever 122 which is connected to the left rear brake and, through the swinging shaft 88, to the corresponding lever for the right rear brake. The lever 114 has mounted thereon by a pivot or other fastening a bar or bracket 124 engaging the two shafts 88 and 98 and operating the rear brakes when the pedal is depressed. The hand lever is shown connected to the lever 122 by a cable 86, and operates only the rear brakes the bar 124 acting as a lost motion connection between lever 122 and lever 114.

In the arrangement of Figure 5, the pedal 52 is connected to a horizontal equalizer bar 126 linked at one end to one of two vertical levers 128 connected by the shaft 98 and which are respectively connected to the two front brakes. The shaft 98 is arranged some distance below pivots 130 on which the levers 128 are fulcrumed. The other end of the bar 126 is connected by an adjustable compression link 132 to a vertical lever 134 connected to the left rear brake, and connected below its fulcrum by the shaft 88 to a vertical lever 136 connected to the other rear brake. The hand lever may be connected by a horizontal lever 138 to the link 132, so that it operates the rear brakes only. Lost motion between levers 128 and 134, to permit the hand lever to operate only the rear brakes, is provided by an elongated slot 141 in the equalizer bar 126. When the pivot pin 139 in the link 132 is actuated by the lever 138 it slides in this slot without affecting the front brakes or the foot pedal.

Figure 6 shows the pedal 52 and the hand lever 54 connected to the opposite ends of a vertical lever 140, connected to the left front and rear brakes above and below its pivot 142 (which may be carried either by the side member 38 or the inclined member 40), and rigidly connected below its pivot by a rigid swinging shaft 144 to a corresponding vertical lever connected above and below its pivot 142 to the right front and rear brakes.

Figure 7 shows the pedal pivotally linked or connected to a vertical equalizer formed of a stamping 146 doubled together, and with slots 148 at its upper end having lost-motion engagement with a cross pin 150 carried by a vertical lever 152 pivoted at 154 and connected to the hand lever at its lower end. If desired, pin 150 may be shifted to another hole 156 to change the ratio between front and rear brakes. The lever 152 is connected to the left rear brake below the pivot 154, and below this pivot it also has connected thereto the rigid shaft 88 for connecting it to a corresponding lever (not shown) for operating the right rear brake.

The lower end of the bar 146 is pivoted to a vertical lever 156 mounted on the pivot 154 and connected to the left front brake, and connected below pivot 154 by the rigid shaft 98 to a lever operating the right front brake. The equalizer bar 146 may have a projection 158 limiting its pivotal movement, so that the rear brakes may be operated by the pedal even if something gives way in the front brake connections.

In Figures 8 and 9, the pedal connection 72 has at its end a cross pin 160 riding in slots 162. One of these slots is formed in a vertical lever 164 pivoted at 166, and which is directly connected to the left rear brake connection 50 and which has, below the pivot 166, connection with the swinging shaft 88 connecting it to the corresponding lever for the right rear brake.

The other slot 162 is formed in a vertical lever 168, also mounted on the pivot 166, and which is directly connected to the left front brake connection 50. The lever 168 is connected, below the pivot 166, to the swinging shaft 98 operating a corresponding lever for the right rear brake. The hand lever operates an equalizer bar 170 pivoted by a pivot 171 to the lever 164 and having a pin-and-slot connection with the lever 168.

In the arrangement of Figure 10, the pedal 52 has above its fulcrum a tension connection 172 with a shaft 174 operating the rear brakes, and has below its fulcrum a compression connection 176 with a shaft 178 operating the front brakes. The connections 172 and 176 may have slotted clevises 173 and 177 respectively at their rear ends, to give a one-way action, i. e. to permit the pedal to operate the shafts but not permit the shafts to operate the pedal when they are actuated by the hand lever 54. The hand lever is connected by the tension member 86 to a vertical equalizer 180 connected to both shafts.

Figure 11 shows the pedal connected to a horizontal bar 182 extending longitudinally of the vehicle, and having a slotted one-way connection with arms on the two brake shafts 174 and 178 to permit alternative operation by either the pedal or the lever. In this case the hand lever is shown connected to a horizontal equalizer bar 184 connected at its ends to arms on the shafts 174 and 178.

In Figure 12 the pedal has above its fulcrum a tension connection 172 having a slotted one-way connection with an arm 186 on a shaft 188 operating the rear brakes. Below its fulcrum the pedal has a compression connection 176, having a slotted one-way connection with a novel Y-shaped lever 190 rigidly connected to, and serving as a rigid connection between, short hollow shafts 192 sleeved on the ends of the shaft 188, and arranged to operate the front brakes. The hand lever operates a vertical equalizer 194 connected to both shafts.

While several illustrative embodiments have been described in detail, it is not my intention to limit the scope of the invention to those particular embodiments, or otherwise than by the terms of the appended claims.

I claim:

1. A vehicle having front brakes and rear brakes, a lever swinging about a horizontal axis in a vertical plane and connected to each brake, a rigid shaft spaced from the axis of the levers for the front brakes and rigidly connecting said front-brake levers and moving bodily to cause them to move in unison, a rigid shaft spaced from the axis of the levers for the rear brakes and rigidly connecting said rear-brake levers and bodily movable to cause them to move in unison, and two alternatively operable devices connected to different ones of said levers for operating the brakes.

2. A vehicle having front brakes and rear brakes, a lever swinging about a horizontal axis in a vertical plane and connected to each brake, a rigid shaft spaced from the axis of the levers for the front brakes and rigidly connecting said front-brake levers and moving bodily to cause them to move in unison, a rigid shaft spaced from the axis of the levers for the rear brakes and rigidly connecting said rear-brake levers and bodily movable to cause them to move in unison, and two alternatively operable devices connected to different ones of said levers for operating the brakes, together with a one-way connection through which movement of the front-brake shaft operates the rear-brake shaft while permitting movement of the rear-brake shaft independently of the front-brake shaft.

3. A vehicle having front brakes and rear brakes, a lever swinging about a horizontal axis in a vertical plane and connected to each brake, bodily-movable rigid shaft means spaced from the axis of the levers and rigidly connecting said levers and moving bodily to cause them to move in unison, and two alternatively operable devices connected to different ones of said levers for operating the brakes.

4. A vehicle having front brakes having respectively connected thereto levers on opposite sides of the vehicle and which levers are rigidly connected by a rigid shaft, rear brakes having respectively connected thereto levers on opposite sides of the vehicle and which levers are rigidly connected by a rigid shaft, a pedal directly connected by non-equalizing means to both shafts for operating them in unison to rock the front and rear levers in opposite directions to apply all four brakes, and an emergency brake lever having an equalizing connection to both of said shafts.

5. A vehicle having front brakes having respectively connected thereto levers on opposite sides of the vehicle and mounted on coaxial pivots and which levers are rigidly connected by a rigid shaft spaced from the axis of said pivots and bodily moving when the levers are operated, rear brakes having respectively connected thereto levers on opposite sides of the vehicle and mounted on said coaxial pivots and which levers are rigidly connected by a rigid shaft spaced from the axis of said pivots and moving bodily when the levers are operated, a pedal directly connected to both shafts for operating them in unison to rock the front and rear levers in opposite directions to apply all four brakes and an emergency brake lever having an equalizing connection to both of said shafts.

6. A vehicle having front brakes having respectively connected thereto levers on opposite sides of the vehicle and mounted on coaxial pivots and which levers are rigidly connected by a rigid shaft spaced from the axis of said pivots and bodily moving when the levers are operated, rear brakes having respectively connected thereto levers on opposite sides of the vehicle and mounted on said coaxial pivots and which levers are rigidly connected by a rigid shaft spaced from the axis of said pivots and moving bodily when the levers are operated, a pedal having an equalizing connection to both shafts, and an emergency brake lever having a connection to one of said shafts.

7. A vehicle having an X-frame comprising side members connected to inclined members secured together in the center of the frame and which has a support carried by the inclined members where they are secured together, vertical brake-operating levers mounted on coaxial pivots on opposite sides of the support, rigid connecting means between said levers below the support and below the inclined members, a pedal connected to the levers above said support, and an emergency lever connected to the levers below the support.

8. A vehicle having an X-frame comprising side members connected to inclined members secured together in the center of the frame and which has a support carried by the inclined members where they are secured together, vertical brake-operating levers mounted on coaxial pivots on opposite sides of the support, rigid connecting means between said levers below the support and below the inclined members, a pedal connected to one of the levers above said support, and an emergency lever connected to another of the levers below the support.

HAROLD G. AXTMANN.